(12) United States Patent
Beyer

(10) Patent No.: US 10,936,539 B2
(45) Date of Patent: Mar. 2, 2021

(54) SOURCE DATA ASSIGNMENT BASED ON METADATA

(71) Applicant: SAP SE, Walldorf (DE)

(72) Inventor: Bertram Beyer, Walldorf (DE)

(73) Assignee: SAP SE, Walldorf (DE)

( * ) Notice: Subject to any disclaimer, the term of this patent is extended or adjusted under 35 U.S.C. 154(b) by 500 days.

(21) Appl. No.: 15/996,950

(22) Filed: Jun. 4, 2018

(65) Prior Publication Data

US 2019/0370348 A1 Dec. 5, 2019

(51) Int. Cl.
*G06F 16/00* (2019.01)
*G06F 16/11* (2019.01)
*G06F 16/13* (2019.01)

(52) U.S. Cl.
CPC ........... *G06F 16/116* (2019.01); *G06F 16/13* (2019.01)

(58) Field of Classification Search
CPC .............................. G06F 16/116; G06F 16/13
See application file for complete search history.

(56) References Cited

U.S. PATENT DOCUMENTS

| | | | | |
|---|---|---|---|---|
| 8,706,971 B1* | 4/2014 | Nayak | ................ | G06F 11/1453 711/133 |
| 8,732,403 B1* | 5/2014 | Nayak | ................... | G06F 3/0641 711/135 |
| 10,827,039 B1* | 11/2020 | Dandekar | ............... | H04L 67/12 |
| 2003/0016696 A1* | 1/2003 | Peterson | ................ | H04L 29/06 370/466 |
| 2003/0072263 A1* | 4/2003 | Peterson | ................ | H04L 29/06 370/235 |
| 2003/0121333 A1* | 7/2003 | Smith | .................. | G01L 5/0028 73/796 |
| 2006/0161863 A1* | 7/2006 | Gallo | ...................... | G06F 9/451 715/810 |
| 2007/0078885 A1* | 4/2007 | Klein, Jr. | ................ | G06F 16/48 |
| 2010/0250497 A1* | 9/2010 | Redlich | ............... | H04L 63/0227 707/661 |
| 2011/0126142 A1* | 5/2011 | Zhou | .................. | G05B 19/4183 715/771 |
| 2013/0268532 A1* | 10/2013 | Doshi | ................. | G06F 16/3331 707/737 |
| 2017/0031965 A1* | 2/2017 | Wilson | ................ | G06F 21/6227 |
| 2017/0154086 A1* | 6/2017 | Meier-Magruder | ....................... | G06F 11/3068 |
| 2018/0005186 A1* | 1/2018 | Hunn | ..................... | G06F 40/103 |
| 2018/0098245 A1* | 4/2018 | Livanos | .................. | H04L 47/14 |
| 2018/0181262 A1* | 6/2018 | Beyer | ................... | G06F 3/0482 |
| 2019/0005104 A1* | 1/2019 | Prabhu | .................. | G06Q 30/02 |

(Continued)

*Primary Examiner* — Noosha Arjomandi
(74) *Attorney, Agent, or Firm* — Buckley, Maschoff & Talwalkar LLC

(57) ABSTRACT

Provided are systems and methods for linking source data fields to target inputs having a different data structure. In one example, the method may include receiving a request to load a data file from a source data structure to a target data structure, identifying a plurality of target inputs of the target data structure, wherein the plurality of target inputs include a format of the target data structure, and at least one of the target inputs has a format that is different from a format of a source data structure, dynamically linking the plurality of source data fields to the plurality of target inputs based on metadata of the plurality of source data fields, and loading the data file from the source data structure to the target data structure.

17 Claims, 7 Drawing Sheets

(56) References Cited

U.S. PATENT DOCUMENTS

2019/0370348 A1\* 12/2019 Beyer ................... G06F 16/13
2019/0392929 A1\* 12/2019 Gassman ............... G16H 40/67

\* cited by examiner

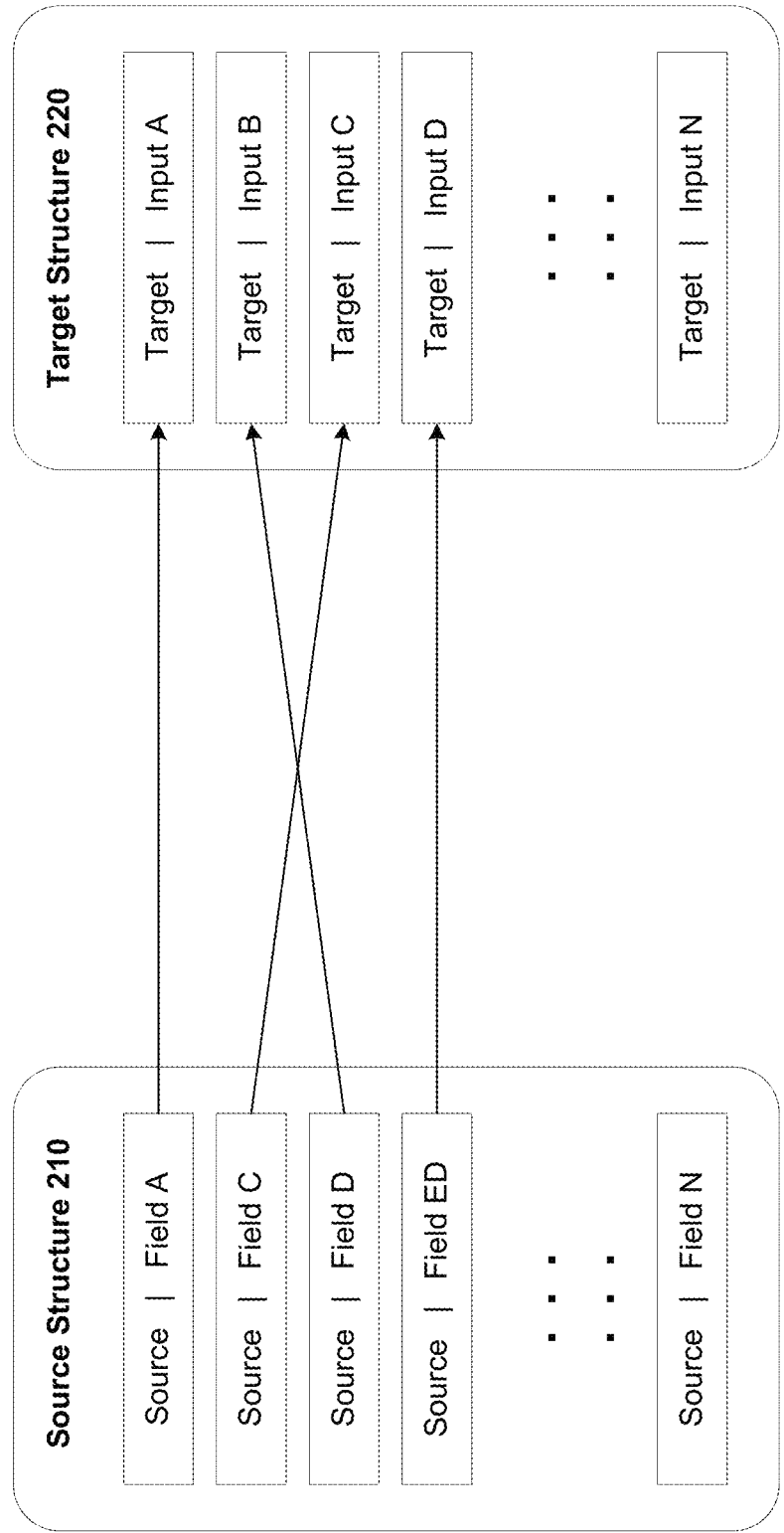

| Condition | Added Weight |
|---|---|
| Equal name | 2 |
| Similar name but not equal | 1 |
| Equal semantic type | 1 |
| Equal data type | 4 |
| Compatible data type but not equal | 3 |

FIG. 3A

| Rule Node Type | Name | Semantic Type | Data Type |
|---|---|---|---|
| Source | A | x | a |
| Source | C | y | b |
| Source | D | y | b |
| Source | ED | y | d (compatible to c) |
| Input | A | x | a |
| Input | B | y | b |
| Input | C | z | b |
| Input | D | z | c |

| Source/Target | Input A, x, a | Input B, y, b | Input C, z, b | Input D, z, c |
|---|---|---|---|---|
| Source A, x, a | 7 | 1 | 0 | 2 |
| Source C, y, b | 0 | 5 | 4 | 0 |
| Source D, y, b | 0 | 5 | 6 | 2 |
| Source ED, y, d | 3 | 1 | 1 | 4 |

FIG. 4B

| Source/Target | Input A, x, a | Input B, y, b | Input C, z, b | Input D, z, c |
|---|---|---|---|---|
| Source A, x, a | - | - | - | - |
| Source C, y, b | - | 5 | 6 | 0 |
| Source D, y, b | - | 5 | 4 | 2 |
| Source ED, y, d | - | 1 | 1 | 4 |

FIG. 4C

| Source/Target | Input A, x, a | Input B, y, b | Input C, z, b | Input D, z, c |
|---|---|---|---|---|
| Source A, x, a | - | - | - | - |
| Source C, y, b | - | - | - | - |
| Source D, y, b | - | 5 | - | 2 |
| Source ED, y, d | - | 1 | - | 4 |

FIG. 4D

| Source/Target | Input A, x, a | Input B, y, b | Input C, z, b | Input D, z, c |
|---|---|---|---|---|
| Source A, x, a | - | - | - | - |
| Source C, y, b | - | - | - | - |
| Source D, y, b | - | - | - | - |
| Source ED, y, d | - | - | - | 4 |

```
                    ┌─────────────────────────────────────┐ 510
                    │ Receiving a Request to Load a Data File including │
                    │ Source Data Fields from a Source Data Structure to a │
                    │         Target Data Structure        │
                    └─────────────────────────────────────┘
                                       │
                                       ▼
                    ┌─────────────────────────────────────┐ 520
                    │ Identifying Target Inputs of the Target Data Structure │
                    │ having a Format that is Different than the Source Data │
                    │              Structure               │
                    └─────────────────────────────────────┘
                                       │
                                       ▼
                    ┌─────────────────────────────────────┐ 530
                    │ Dynamically Linking the Source Data Fields to the │
                    │ Target Inputs based on Metadata of the Source Data │
                    │                Fields                │
                    └─────────────────────────────────────┘
                                       │
                                       ▼
                    ┌─────────────────────────────────────┐ 540
                    │ Loading the Data File from the Source Data Structure │
                    │    to the Target Data Structure based on the    │
                    │            Dynamically Linking             │
                    └─────────────────────────────────────┘
```

SOURCE DATA ASSIGNMENT BASED ON METADATA

BACKGROUND

A data warehouse is a system that accumulates data from a wide range of sources within an organization and is used to guide management decisions. A common source of data for the data warehouse is an organization's operational databases (e.g., relational databases, etc.) The data warehouse provides a centralized repository that integrates data from disparate sources into a single location. The accumulated data may be used to create analytical reports and other forms of intelligence which can be useful for an enterprise. For example, the reports may provide a deeper knowledge about underlying business data, helping an organization understand a current state and predict and plan for future states.

Before the data within the data warehouse can be used for generating reports, the data must be loaded into a target system such as an enterprise data warehouse report generating system, or the like. In order to load the data, the data may be transferred from the source system (e.g., operational database) into the target system (e.g., the data warehouse or a sub-component of the data warehouse). However, the target system may have different names, values, rules, and the like, for data items. Therefore, the transfer is typically overseen by a user who manually maps data items from the source data structure to data locations of the target system. This process often involves hundreds or even thousands of manual assignments, requiring significant coordination and time by the user. Accordingly, what is needed is mechanism for automatically assigning source data from a source system to a target system.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 2A-2B are diagrams illustrating a process of dynamically linking data from a source data structure to a target data structure in accordance with example embodiments.

FIG. 3A is a diagram illustrating a table of weighted values for metadata in accordance with an example embodiment.

FIG. 3B is a diagram illustrating a table of source metadata and target metadata for dynamically linking source data to target inputs, in accordance with an example embodiment.

FIGS. 4A-4D are diagrams illustrating a process of matching data fields of source data to target data based on metadata, in accordance with example embodiments.

FIG. 5 is a diagram illustrating a method for assigning source data to a target data structure based on metadata in accordance with an example embodiment.

Figure 1:
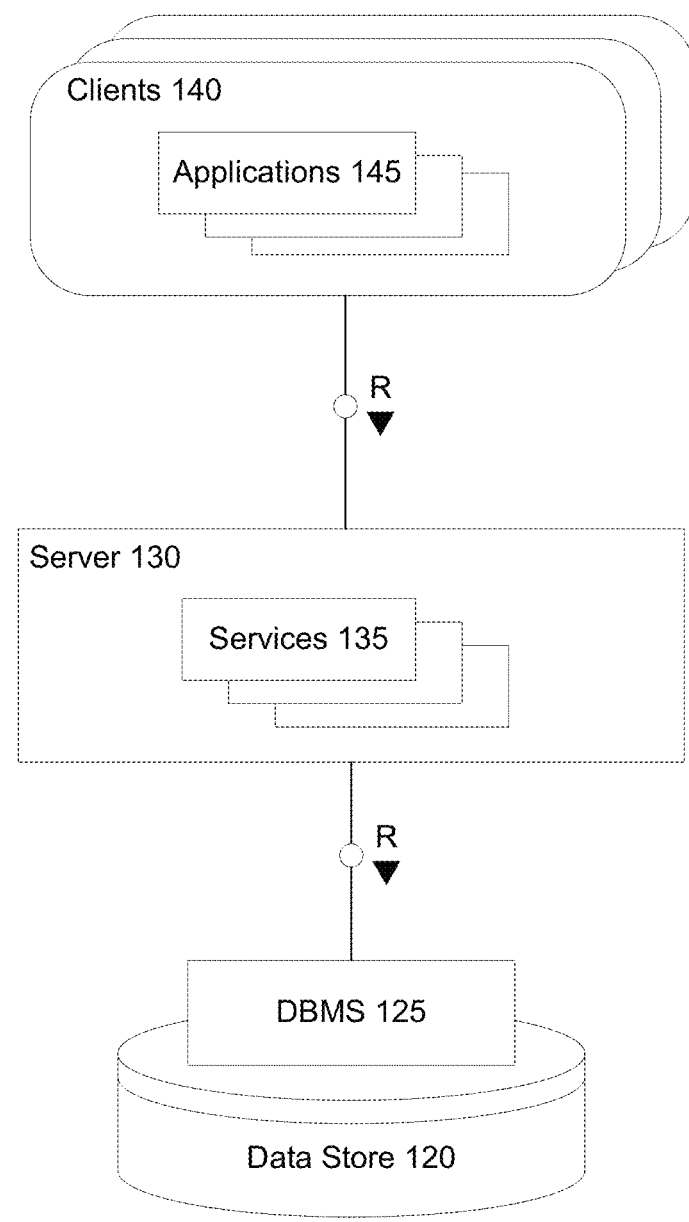
FIG. 1 is a diagram illustrating a database system architecture in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a system and method for dynamically linking data from a source data structure such as a database to data in a target data structure such as a data warehouse. The data warehouse may include an analytics engine for processing the data from the source system. In this example, when data comes into the target system via the source system, the data may be transformed into a target data structure before the data can be processed by the analytics engine. Often, the data may be transformed multiple time within a data warehouse. Instead of requiring a user to determine how to map source data fields within the source data structure to target inputs within a target data structure, the system can dynamically and automatically link fields in the source data structure to inputs of the target data structure based on metadata of the source data fields. According to various embodiments, various metadata attributes of a source data field may be compared to metadata attributes of a plurality of target inputs to find the best possible link between the two. The system may determine a weight value for the source data field with respect to each of the possible target inputs to find the best match. When a source data field matches multiple possible target inputs, the system can use metadata values of other source data fields with respect to the target inputs to eliminate possible matches until a single match is determined.

The process of transferring data from a source data field to a target data field may include a transformation process in which data from the source data field is transferred to an input where it is operated on via one or more transformation rules/steps. Furthermore, the transformed data may be transferred through an output to a target field. As described herein, the example embodiments may link together a source data field to an input of a target data field with a transformation process being performed in between the input and the target data field.

Both the source data structure and the target data structure may have many data fields having different names, values, relationships, and the like. A problem occurs when adding multiple source fields to a transformation rule. Without knowing the purpose the fields, the system needs to anticipate the right input for each. Related systems may anticipate a mapping using a simple name and type comparison between a source data field and an input of the target data field. This comparison may works in standard scenarios where sources and inputs are equally named and typed.

However, this approach is limited when sources and inputs are not equally typed or named. Furthermore, it is also possible that there is more than one valid source with different names for the same input and the system must somehow choose between multiple possibilities. The example embodiments overcome these issues through the use of metadata of the source data fields and the target inputs. Accordingly, a dynamic and automated match can be generated by the system without requiring user intervention.

FIG. 1 illustrates a system architecture of a database 110 in accordance with an example embodiment. It should be appreciated that the embodiments are not limited to architecture 110 or to a database architecture, however, FIG. 1B is shown for purposes of example. Referring to FIG. 1, the architecture 110 includes a data store 120, a database management system (DBMS) 125, a server 130, services 135, clients 140 and applications 145. Generally, services 135 executing within server 130 receive requests from applications 145 executing on clients 140 and provides results to applications 145 based on data stored within data store 110. For example, server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145 (e.g., drag-and-drop operations), retrieving data from data store 110 based on the requests, processing the data received from data store 110, and providing the processed data to applications 145.

In one non-limiting example, a client 140 may execute an application 145 to perform visual analysis of analytical data based causing analytic data to be output to a user interface on a display of the client 140 which allows the user to view analytical information such as charts, graphs, tables, reports, and the like, based on the analytic data. The application 145 may pass analytic information based on the input to one or more of services 135. An SQL script may be generated based on the request and forwarded to DBMS 125. The DBMS 125 may execute the SQL script to return a result set that is based on data stored in the data store 120, and the application 145 creates a report/visualization based on the result set. As another example, the analytic data may be input by the user and provided directly from the application 145 to the DBMS 125 or the data store 120.

The services 135 executing on server 130 may communicate with DBMS 120 using database management interfaces such as, but not limited to, Open Database Connectivity (ODBC) and Java Database Connectivity (JDBC) interfaces. These types of services 135 may use Structured Query Language (SQL) to manage and query data stored in data store 120. The DBMS 125 serves requests to query, retrieve, create, modify (update), and/or delete data from database files stored in data store 120, and also performs administrative and management functions. For example, the data store 120 may represent a source data structure and the DBMS 125 may represent a target data structure as described herein. As another example, the data store 120 may be the source data structure and a service 135, an application 145, or the like, may be the target data structure.

Server 130 may be separated from or closely integrated with DBMS 125. A closely-integrated server 130 may enable execution of services 135 completely on the database platform, without the need for an additional server. For example, server 130 may provide a comprehensive set of embedded services which provide end-to-end support for Web-based applications. The services 135 may include a lightweight web server, configurable support for Open Data Protocol, server-side JavaScript execution and access to SQL and SQLScript. Server 130 may provide application services (e.g., via functional libraries) using services 135 that manage and query the database files stored in the data store 120. The application services can be used to expose the database data model, with its tables, views and database procedures, to clients 140. In addition to exposing the data model, server 130 may host system services such as a search service.

Data store 120 may comprise any query-responsive data source or sources that are or become known, including but not limited to a structured-query language (SQL) relational database management system. Data store 120 may include a relational database, a multi-dimensional database, an Extensible Markup Language (XML) document, or any other data storage system storing structured and/or unstructured data. The data of data store 120 may be distributed among several relational databases, dimensional databases, and/or other data sources. Embodiments are not limited to any number or types of data sources. In some embodiments, the data of data store 120 may include files having one or more of conventional tabular data, row-based data, column-based data, object-based data, and the like. Moreover, the data may be indexed and/or selectively replicated in an index to allow fast searching and retrieval thereof. Data store 120 may support multi-tenancy to separately support multiple unrelated clients by providing multiple logical database systems which are programmatically isolated from one another. Furthermore, data store 120 may support multiple users that are associated with the same client and that share access to common database files stored in the data store 120.

The architecture 110 may include metadata defining objects which are mapped to logical entities of data store 120. The metadata may be stored in data store 120 and/or a separate repository (not shown). The metadata may include information regarding dimension names (e.g., country, year, product, etc.), dimension hierarchies (e.g., country, state, city, etc.), measure names (e.g., profit, units, sales, etc.) and any other suitable metadata. According to some embodiments, the metadata includes information about each data field within the data store such as a field name (string of letters identifying the field), a semantic type (purpose of the field such as date, currency, unit, amount, etc.), a data type (number, fraction, string, integer, character, etc.), and the like. The metadata may be collected during operation of system and may be used to assign source data fields to target fields during a transfer of data between a source data structure and a target data structure in response to a received query.

Each of clients 140 may include one or more devices executing program code of an application 145 for presenting user interfaces to allow interaction with application server 130. The user interfaces of applications 145 may comprise user interfaces suited for reporting, data analysis, and/or any other functions based on the data of data store 120. Presentation of a user interface as described herein may include any degree or type of rendering, depending on the type of user interface code generated by server 130. For example, a client 140 may execute a Web Browser to request and receive a Web page (e.g., in HTML format) from application server 130 via HTTP, HTTPS, and/or Web Socket, and may render and present the Web page according to known protocols. One or more of clients 140 may also or alternatively present user interfaces by executing a standalone executable file (e.g., an .exe file) or code (e.g., a JAVA applet) within a virtual machine.

Data sources and data targets have a common set of metadata which describe what data they are working with. The metadata for a source field may define what data you a getting from the source field (i.e., what data is being output). Meanwhile, the metadata for a target input may define what data the data field/input is expecting (i.e., the expected input). Various metadata attributes can be used for comparison between the source data field and the target input and they include name, semantic type, data type, and the like. The name may be a string of letters. The semantic type may describe the fields purpose, for example, a date, a currency, a unit, an amount, and the like. The data type may indicate what technical data is expected. For example, the data type may be numbers of a certain length, with or without a fraction, text, integers, and the like.

Figure 2A:
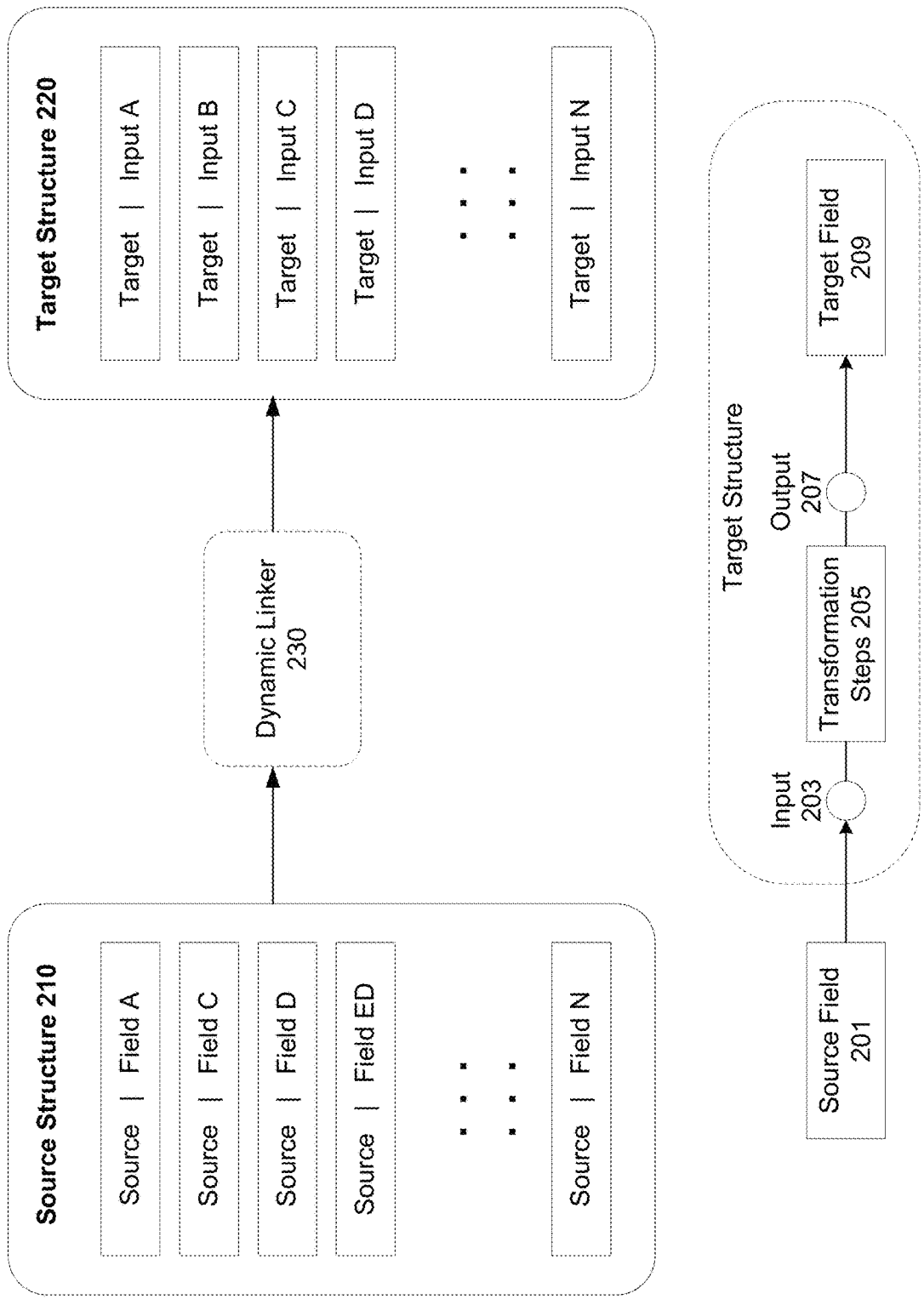

FIGS. 2A and 2B illustrate a process of dynamically linking data from a source data structure to a target data structure in accordance with example embodiments. Referring to FIGS. 2A and 2B, a source data structure 210 is dynamically linked to a target data structure 220 via a dynamic linker 230. For example, the source data structure 210 may be a source system/application and the target data structure may be data warehouse including a partition, a data block, a table, a memory range, a blob, and/or the like, where the data is being transferred for further action. The dynamic linker 230 may be a software program that runs on one or more of the source data structure 210, the target data structure 220, and an intermediate system between the source data structure 210 and the target data structure 220. In FIG. 2A, the source structure 210 includes a plurality of source data fields (A, C, D, and ED) which are mapped to inputs in the target data structure 220 including a plurality of target inputs (A, B, C, and D). Meanwhile, FIG. 2B shows the resulting assignment between the source data fields and the target inputs after performing the dynamically linking, which is further described with respect to FIGS. 3A-3B and 4A-4D.

Furthermore, FIG. 2A includes a map between a source field 201 and a target field 209. Here, a transformation process 205 is used to convert the data from a format of the source field 201 into a format of the target field 209. The transformation process 205 includes an input 203 and an output 207. As described herein, the dynamically linking may be performed between the source field 201 and the input 203. Here, the target structure may include the input 203, the transformation process 205, the output 207, and the target field 209. For convenience, in some examples herein, the input 203 is also referred to as a target input, an input of a target field, and the like.

Equal names between a source data field and an input are a strong indicator that a source data field and the input should be connected. It is also likely that names are not totally equal. For example, one name may have additional character(s) at the beginning or the end, etc. This types of name comparisons may be defined as similar names in which one name starts or ends equally to another name, no matter which name is the source data field or the target input. For example, Source BIC/MYDATA could match to a MYDATA Input. Nevertheless, the name is not sufficient as the data type must match too. Sources and inputs with equal data types can always be mapped as no conversion is needed.

In some cases, there are also compatible data types. Example: INT2 (length 5) could also be written into a CHAR (at least of length 5) without losing digits. If the values of a CHAR always contain digits only it is also possible for CHAR to be mapped to INT2. The system defines compatible data types as data which could be interpreted as another data type without losing information. For semantic types, there are just a few possible types. Example: Semantic type is "amount" that defines the amount of money in a certain currency. By default, the system may define two data types for it: CURR (precision 16, scale 14) and FLTP (precision 16, scale 16). CURR is mostly used for amounts only but FLTP could also be used in a different context. Otherwise the semantic type may not be entered for source or input. Therefore, semantic type may have a smaller contribution to the overall linking/mapping process or even no contribution at all.

FIG. 3A illustrates a table 310 of weighted values for metadata in accordance with an example embodiment, and FIG. 3B illustrates a table 320 of source metadata and target metadata for dynamically linking source data to target data, in accordance with an example embodiment. Referring to FIG. 3A, a quantifiable weight may be used to express a similarity between a source data field and an target input. The table 310 lists a non-limiting example of conditions 312 and the weights 314 which are given to the conditions 312 and which may be used to determine a metadata weighted value between a source data field and a target input.

In the example of FIG. 3A, a minimum weighted threshold (e.g., 4, etc.) may be required for the system to define a source data field as a match to a target input but a greater value may be identified as better. In this non-limiting example, an equal data type may be given a greater weight than an equal name or an equal semantic type, however embodiments are not limited thereto. In addition, a similar name (although not identical) and a compatible data type (although not identical) may be given weight when determining if a source data field and a target input are a match. In this example, if a source data field has both a similar name and a compatible data type as a target input, the two weights may be enough to satisfy the minimum threshold for a match even though neither is identical, but embodiments are not limited thereto.

Referring to FIG. 3B, a non-limiting example of source data field metadata values and target input metadata values are compared with each other. In this example, the table 320 includes a column for three different metadata attributes including a name 322 of the source data field and the target input, a semantic type 324 of the source data field and the target input, and a data type 326 of the source data field and the target input. The sample table 320 of metadata values may be used to dynamically link the source data fields to the target inputs as shown in the process 400A-400D of FIGS. 4A-4D which matches data fields of source data to target data based on metadata, in accordance with example embodiments.

Referring to the examples of FIGS. 4A-4D, a determination may be performed to dynamically link each source data field with a best-fit target input through an iterative process. The iterative process may be performed such that each loop matches one or more source data fields to one or more target inputs.

Referring to FIG. 4A, a first iterative step in 400A is performed to link source data field A to target input A. In this example, it is pretty clear that input A is the same as source data field A because the data type, the name, and the semantic type are all equal to one another creating the greatest possible weighted value of '7 for this example. Therefore, in process step 400A a dynamic link 402 is made between source data field A and target input A. In this example, because the source data field A and target input A have been used, they may both be removed from consideration for further dynamic linking.

In process step 400B, the metadata values for source data field A and target input A may not be considered because they have been dynamically linked. However, in this case, the process step 400B does not identify a clear winner for target input B because both source data field C and source data field D are determined to have the same weighted value with respect to target input B of '5. When this occurs, the system may take into consideration results of other steps of the iterative process and come back and select a winner from among the equally weighted values. For example, the system may proceed to the next column (i.e., target input C) and determine whether a dynamic link can be performed. In this example, the process step 400B determines a dynamic link 404 between the source data field C and the target input C based on a highest weighted metadata value.

Meanwhile, referring to process step 400C, the system may return back to the previous column (i.e., target input B) and determine whether one winning metadata value is present after the previously dynamically linked values are removed from consideration. In this case, both the source data fields A and C have been used, and the target inputs A and C have been used. Therefore, these metadata values may be removed from consideration. As a result of removing the metadata values for source data field C from consideration, the system can now make a determination that source data field D is a match for target input B. Accordingly, in step 400C a dynamic link 406 is determined between source data field D and target input B. If the process were still unable to make this determination, the next column could be processed, and the system could the return back to the column. This could then be repeated until one winning value is present. Furthermore, as shown in process step 400D, the system determines a dynamic link 408 between the last remaining source data field ED and target input D based on remaining metadata values. Results of the dynamic linking process 400A-400D are shown in the mapping in FIG. 2B which includes lines between mapped source data fields and target inputs.

FIG. 5 illustrates a method 500 for assigning source data to a target data structure based on metadata in accordance with an example embodiment. As an example, the method 500 may be performed by a database node included within a distributed database system. As another example, the method 500 may be performed by a computing device such as a server, a cloud platform, a user device, an on-premises server, and the like. In some examples, the method 500 may be performed by a plurality of devices in combination. Referring to FIG. 5, in 510, the method may include receiving a request to load a data file from a source data structure to a target data structure. For example, the data file may include a plurality of source data fields (or other data items) that have a format of the source data structure. Each data field may have metadata associated therewith such as a name of the data field, a purpose/semantic of the data field, a data type of the data field, and the like.

In 520, the method may include identifying a plurality of target inputs of the target data structure that may be associated with the source data fields in the data file. In this example, the plurality of target inputs may each comprise a format of the target data structure. According to various embodiments, and at least one of the target inputs can have a format that is different from a format of the source data structure. In some cases, all or most of the data fields may have a different format than the source data structure, however, embodiments are not limited thereto.

In 530, the method may include dynamically linking the plurality of source data fields to the plurality of target inputs based on metadata of the plurality of source data fields. For example, each source data field may be linked to a target input based on metadata of the source data field with respect to the metadata of the plurality of target inputs. Here, the source data fields may be one-to-one mapped to the target inputs, however, embodiments are not limited thereto. In another example, a source data field may be mapped to multiple target inputs or multiple source data fields may be mapped to a single target input. In 540, the method may include loading the data file from the source data structure to the target data structure based on the dynamically linking of the plurality of source data fields. In some embodiments, the loading may include converting (transforming) data included in a source data field to a respective format of a linked target input. Accordingly, the data may be operated on by software and other systems of the target data structure that are expecting data to have a format of the target data structure.

In some embodiments, the dynamically linking may include assigning a source data field to a target input based on metadata of the respective source data field with respect to metadata of the plurality of target inputs. For example, the dynamically linking may include generating a weighted value for a source data field with respect to each of the plurality of target inputs based on metadata of the source data field and metadata of each of the plurality of target inputs. In this example, the method may assign the source data field to a target input from among the plurality of target inputs which has a greatest weighted value. When two or more target inputs each share a greatest weighted value with respect to the source data field, the dynamically linking may include eliminating possible target inputs based on the dynamically linking of other source data fields to the two or more target inputs, and selecting one of the two or more target inputs based on metadata of the two or more target inputs with respect to remaining source data fields. Furthermore, in response to linking a source data field to a target input, the dynamically linking may include removing the linked target input from consideration for linking with remaining source data fields of the file.

Figure 6:
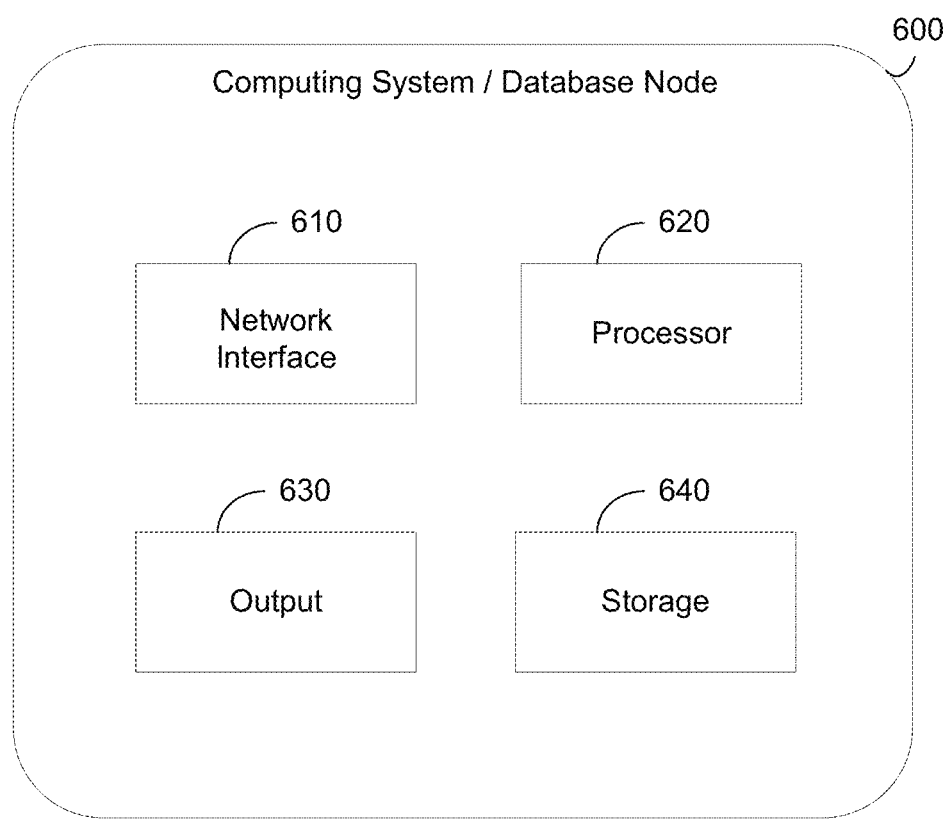
FIG. 6 is a diagram illustrating a computing system in accordance with an example embodiment.

FIG. 6 illustrates a computing system 600, in accordance with an example embodiment. For example, the computing system 600 may be a database node, a server, a cloud platform, a user device, or the like. In some embodiments, the computing system 600 may be distributed across multiple devices. Referring to FIG. 6, the computing system 600 includes a network interface 610, a processor 620, an output 630, and a storage device 640 such as an in-memory. Although not shown in FIG. 6, the computing system 600 may also include or be electronically connected to other components such as a display, an input unit, a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The output 630 may output data to an embedded display of the computing system 1000, an externally connected display, a display connected to the cloud, another device, and the like. For example, the output 630 may include a port, an interface, a cable, a wire, a board, and/or the like, with input/output capabilities. The network interface 610, the output 630, or a combination thereof, may interact with applications executing on other devices. The storage device 640 is not limited to a particular storage device and may include any known memory device such as RAM, ROM, hard disk, and the like, and may or may not be included within the cloud environment. The storage 640 may store software modules or other instructions which can be executed by the processor 620 to perform the method 500 shown in FIG. 5.

According to various embodiments, the processor 620 may receive a request to load the data file from a source data structure to a target data structure. Here, the data file may include a plurality of source data fields that have a format of the source data structure. The processor 620 may identify a plurality of target inputs of the target data structure that correspond to the plurality of source data fields. For example, the plurality of target inputs may have a format of the target data structure, and at least one of the target inputs may have a format that is different from a format of the source data structure.

According to various embodiments, the processor 620 may dynamically link the plurality of source data fields to the plurality of target inputs based on metadata of the plurality of source data fields, and load the data file from the source data structure to the target data structure based on the dynamically linked plurality of source data fields. In some embodiments, the processor 620 may further convert data included in a source data field to a respective format of a linked target input. The metadata for each source data field may include one or more of a name of the source data field, a semantic type of the source data field, and a data type of the source data field. The metadata may be compared by the processor 620 on a field-by-field basis to find a target input that is the best-possible fit for the source data field.

In some embodiments, the processor 620 may assign a source data field to a target input based on metadata of the respective source data field with respect to metadata of the plurality of target inputs. For example, the processor 620 may generate a weighted value for a source data field with respect to each of the plurality of target inputs based on metadata of the source data field and metadata of each of the plurality of target inputs. In this example, the processor 620 may assign the source data field to a target input from among the plurality of target inputs which has a greatest weighted value. When two or more target inputs each share a greatest weighted value with respect to the source data field, the processor 620 may eliminate the two or more target inputs down to one by process of elimination based on source data field mapping of other source data fields. In some embodiment, in response to a source data field being linked to a target input, the processor 620 may remove the linked target input from consideration for linking with remaining source data fields of the file.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a memory configured to store a data file; and
a hardware processor configured to
 receive a request to load the data file from a source data structure to a target data structure, the data file comprising a plurality of source data fields that have a format of the source data structure,
 identify a plurality of target inputs of the target data structure, wherein the plurality of target inputs comprise a format of the target data structure which is different from the format of the source data structure,
 dynamically link the plurality of source data fields to the plurality of target inputs based on metadata of the plurality of source data fields,
 convert data in the plurality of source data fields of the data file from the format of the source data structure to the format of the target data structure, and
 load the data file including the converted data from the source data structure to the target data structure based on the dynamically linked plurality of source data fields.

2. The computing system of claim 1, wherein the metadata for each source data field comprises one or more of a name of the source data field, a semantic type of the source data field, and a data type of the source data field.

3. The computing system of claim 1, wherein the hardware processor is configured to assign a source data field to a target input based on metadata of the respective source data field with respect to metadata of the plurality of target inputs.

4. The computing system of claim 1, wherein the hardware processor is configured to generate a weighted value for a source data field with respect to each of the plurality of target inputs based on metadata of the source data field and metadata of each of the plurality of target inputs.

5. The computing system of claim 4, wherein the hardware processor is configured to assign the source data field to a target input from among the plurality of target inputs which has a greatest weighted value.

6. The computing system of claim 4, wherein, when two target inputs each share a greatest weighted value with respect to the source data field, the hardware processor is configured to select one of the two target inputs based on metadata of the two target inputs with respect to remaining source data fields.

7. The computing system of claim 1, wherein, in response to a source data field being linked to a target input, the hardware processor is configured to remove the linked target input from consideration for linking with remaining source data fields of the file.

8. A method comprising:
receiving a request to load a data file from a source data structure to a target data structure, the data file comprising a plurality of source data fields that have a format of the source data structure;
identifying a plurality of target inputs of the target data structure, wherein the plurality of target inputs comprise a format of the target data structure which is different from the format of the source data structure;
dynamically linking the plurality of source data fields to the plurality of target inputs based on metadata of the plurality of source data fields;
converting data in the plurality of source data fields of the data file from the format of the source data structure to the format of the target data structure; and
loading the data file including the converted data from the source data structure to the target data structure based on the dynamically linking of the plurality of source data fields.

9. The method of claim 8, wherein the metadata for each source data field comprises one or more of a name of the source data field, a semantic type of the source data field, and a data type of the source data field.

10. The method of claim 8, wherein the dynamically linking comprises assigning a source data field to a target input based on metadata of the respective source data field with respect to metadata of the plurality of target inputs.

11. The method of claim 8, wherein the dynamically linking comprises generating a weighted value for a source data field with respect to each of the plurality of target inputs based on metadata of the source data field and metadata of each of the plurality of target inputs.

12. The method of claim 11, wherein the dynamically linking comprises assigning the source data field to a target input from among the plurality of target inputs which has a greatest weighted value.

13. The method of claim 11, wherein, when two target inputs each share a greatest weighted value with respect to the source data field, the dynamically linking further comprises selecting one of the two target inputs based on metadata of the two target inputs with respect to remaining source data fields.

14. The method of claim 8, wherein, in response to linking a source data field to a target input, the dynamically linking comprises removing the linked target input from consideration for linking with remaining source data fields of the file.

15. A non-transitory computer-readable storage medium storing program instructions that when executed cause a processor to perform a method comprising:
receiving a request to load a data file from a source data structure to a target data structure, the data file comprising a plurality of source data fields that have a format of the source data structure;
identifying a plurality of target inputs of the target data structure, wherein the plurality of target inputs comprise a format of the target data structure which is different from the format of the source data structure;
dynamically linking the plurality of source data fields to the plurality of target inputs based on metadata of the plurality of source data fields;
converting data in the plurality of source data fields of the data file from the format of the source data structure to the format of the target data structure; and
loading the data file including the converted data from the source data structure to the target data structure based on the dynamically linking of the plurality of source data fields.

16. The non-transitory computer readable medium of claim 15, wherein the metadata for each source data field comprises one or more of a name of the source data field, a semantic type of the source data field, and a data type of the source data field.

17. The non-transitory computer readable medium of claim 15, wherein the dynamically linking comprises assigning a source data field to a target input based on metadata of the respective source data field with respect to metadata of the plurality of target inputs.

* * * * *